(12) United States Patent
Onodera (10) Patent No.: US 12,420,754 B2
(45) Date of Patent: Sep. 23, 2025

(54) BRAKE CONTROL DEVICE AND BRAKE CONTROL METHOD

(71) Applicant: Mitsubishi Electric Corporation, Tokyo (JP)

(72) Inventor: Shumpei Onodera, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 54 days.

(21) Appl. No.: 18/573,498

(22) PCT Filed: Aug. 20, 2021

(86) PCT No.: PCT/JP2021/030513
§ 371 (c)(1),
(2) Date: Dec. 22, 2023

(87) PCT Pub. No.: WO2023/021677
PCT Pub. Date: Feb. 23, 2023

(65) Prior Publication Data
US 2024/0294149 A1    Sep. 5, 2024

(51) Int. Cl.
*B60T 8/17* (2006.01)
*B60T 8/172* (2006.01)
*B60T 8/1761* (2006.01)
*B60T 8/1763* (2006.01)

(52) U.S. Cl.
CPC .......... *B60T 8/1705* (2013.01); *B60T 8/172* (2013.01); *B60T 8/17616* (2013.01); *B60T 8/17636* (2013.01); *B60T 2240/06* (2013.01)

(58) Field of Classification Search
CPC .... B60T 8/1705; B60T 8/172; B60T 8/17616; B60T 8/17636; B60T 8/17; B60T 8/1893; B60T 8/3235; B60T 8/1761; B60T 2240/06; B60T 1/10; B60T 2270/604; B60T 13/365; B60T 13/586; B60T 13/665; B60T 17/228
USPC ...................................................... 701/70, 80
See application file for complete search history.

(56) References Cited

FOREIGN PATENT DOCUMENTS

JP    2005289172 A    10/2005

OTHER PUBLICATIONS

International Search Report (PCT/ISA/210) with translation and Written Opinion (PCT/ISA/237) mailed on Nov. 2, 2021, by the Japan Patent Office for International Application No. PCT/JP2021/030513. (8 pages).

*Primary Examiner* — Hai H Huynh
(74) *Attorney, Agent, or Firm* — BUCHANAN, INGERSOLL & ROONEY PC (57) ABSTRACT

In a railway vehicle, a brake control device controlling a first brake device that presses a friction material against a wheel and a second brake device not using the friction material includes: a wheel load estimation unit estimating a wheel load-based on a wheel speed and a brake force applied to the wheel by the friction material; a friction surface state quantity estimation unit estimating a current friction coefficient of the friction material from a state of a friction surface thereof based on the wheel load, the wheel speed, and a brake force command, and outputting a mirror-surfacing signal indicating the friction surface is in a mirror-surfaced state when the friction coefficient is less than a first threshold value; and a brake control unit controlling operations of the first and second brake devices based on the brake force command and presence or absence of the mirror-surfacing signal.

12 Claims, 5 Drawing Sheets

BRAKE CONTROL DEVICE AND BRAKE CONTROL METHOD

FIELD

The present disclosure relates to a brake control device and a brake control method to be used in a railway vehicle.

BACKGROUND

When a strong brake is applied to a traveling railway vehicle to lock a wheel, the wheel slides on a rail and wears, and a flat surface, that is, a flat is formed on the wheel. When the flat is formed on the wheel, it becomes difficult for the wheel to rotate smoothly, which causes noise, vibration, and the like. An anti-lock brake system is a system that prevents locking of wheels by adjusting a braking force for each axle or each truck of a railway vehicle in order to prevent wear of wheels due to such wheel locking. Patent Literature 1 discloses a technique for an anti-lock brake system for a railway vehicle capable of preventing a wheel from locking, and adequately braking the wheel according to a kind of the brake while maintaining brake performance by maintaining a brake cylinder pressure at high value to give a braking force.

CITATION LIST

Patent Literature

Patent Literature 1: JP 2005-289172 A

SUMMARY OF INVENTION

Problem to be Solved by the Invention

However, according to the above-described related art, wear of the wheel is prevented by weakening the braking force. Therefore, there has been a problem that an actual braking distance may extend with respect to a target braking distance until the railway vehicle stops.

The present disclosure has been made in view of the above, and an object thereof is to obtain a brake control device capable of preventing sliding of a wheel while preventing extension of a braking distance.

Means to Solve the Problem

In order to solve the above problem and achieve the object, the present disclosure is a brake control device for controlling a first brake device that presses a friction material against a wheel to obtain a braking force and a second brake device that does not use the friction material, in a railway vehicle. The brake control device includes: a wheel load estimation unit to estimate a wheel load that is a load received by the wheel from the friction material, based on a wheel speed and a brake force applied to the wheel by the friction material; a friction surface state quantity estimation unit to estimate a friction coefficient of current time of the friction material from a state of a friction surface of the friction material based on the wheel load, the wheel speed, and a brake force command, and output a mirror-surfacing signal indicating that the friction surface is in a mirror-surfaced state when the friction coefficient is less than a prescribed first threshold value; and a brake control unit to control operations of the first brake device and the second brake device, based on the brake force command and presence or absence of the mirror-surfacing signal.

Effects of the Invention

The brake control device of the present disclosure has an effect of preventing sliding of a wheel while preventing extension of a braking distance.

DESCRIPTION OF EMBODIMENTS

Hereinafter, a brake control device and a brake control method according to an embodiment of the present disclosure will be described in detail with reference to the drawings.

Embodiment

Figure 1:
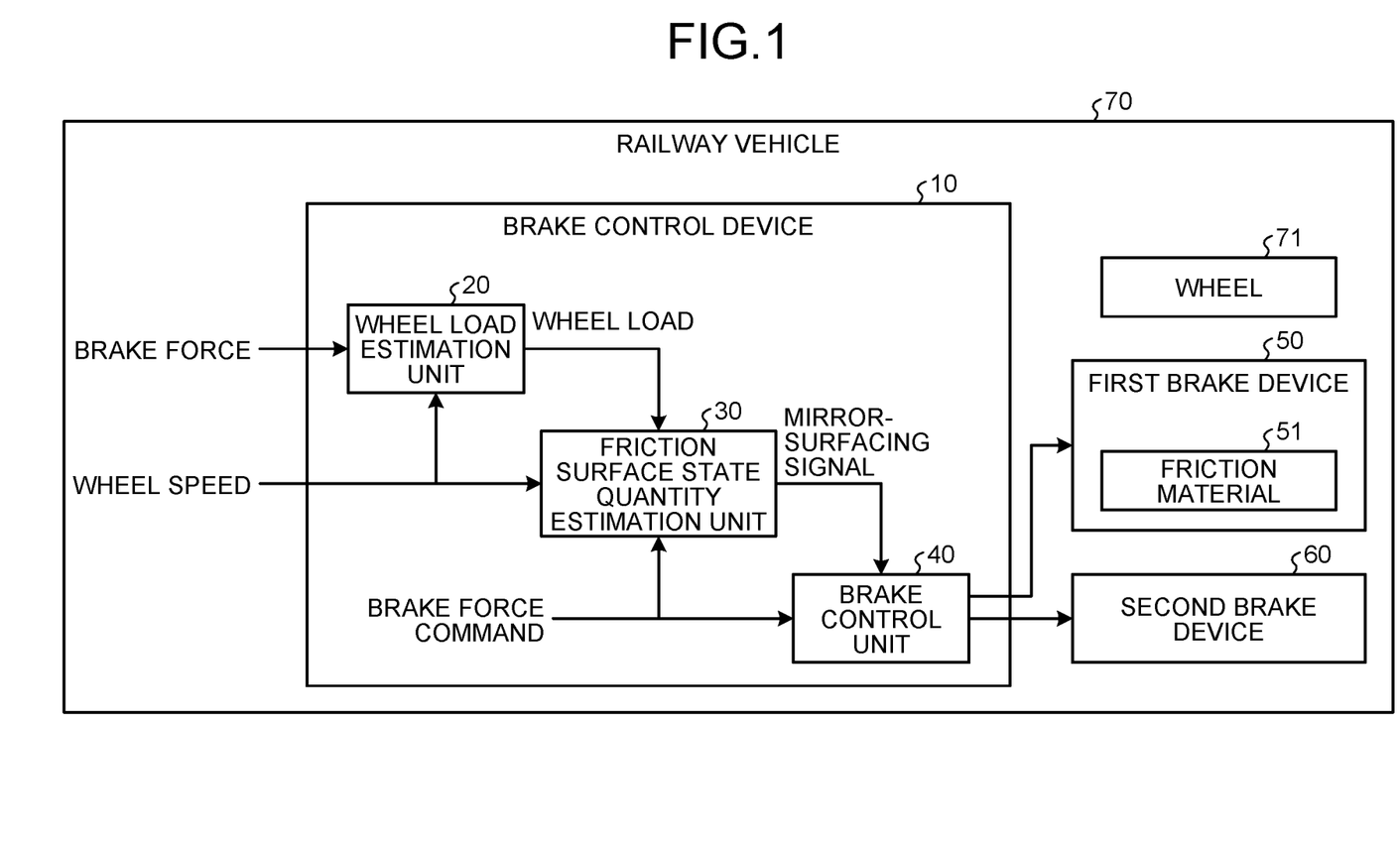
FIG. 1 is a diagram illustrating a configuration example of a brake control device according to an embodiment.

FIG. 1 is a diagram illustrating a configuration example of a brake control device 10 according to the present embodiment. The brake control device 10 is a device to be mounted on a railway vehicle 70. In the railway vehicle 70, the brake control device 10 controls a first brake device 50 and a second brake device 60 to obtain a desired brake force.

The first brake device 50 is a brake device that presses a friction material 51 against a wheel 71 of the railway vehicle 70 to obtain the braking force. The first brake device 50 is, for example, a pneumatic brake device. The friction material 51 is a brake shoe that presses a tread surface of the wheel 71, a friction pad that presses a side surface of the wheel 71 or a disk attached to an axle of the wheel 71, or the like. The second brake device 60 is a brake device that obtains a braking force without using the friction material 51 as described above. The second brake device 60 is, for example, a regenerative brake device. Note that the railway vehicle 70 may include a plurality of second brake devices 60 of different types. In this case, the brake control device 10 controls the first brake device 50 and the plurality of second brake devices 60 to obtain a desired brake force. The brake control device 10 controls individual brake devices such that a total value of brake forces obtained from the individual brake devices becomes a desired brake force.

Figure 2:
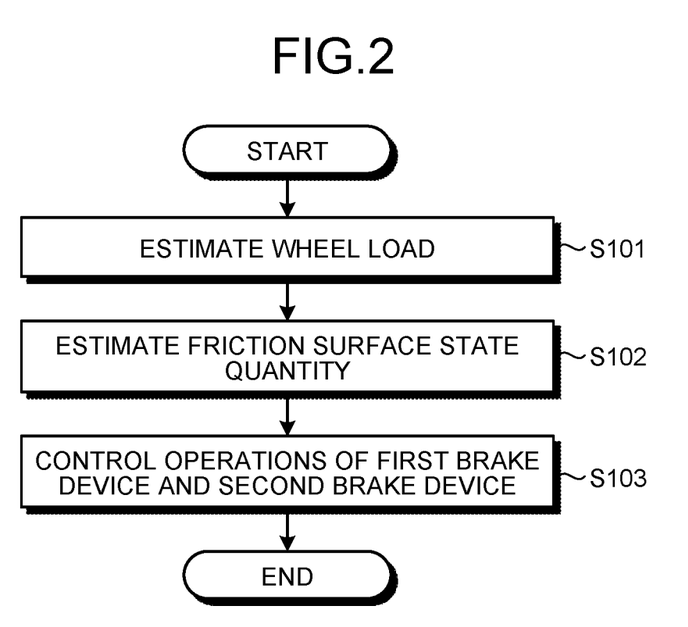
FIG. 2 is a flowchart illustrating an operation of the brake control device according to the embodiment.

A configuration and an operation of the brake control device 10 will be described. As illustrated in FIG. 1, the brake control device 10 includes a wheel load estimation unit 20, a friction surface state quantity estimation unit 30, and a brake control unit 40. FIG. 2 is a flowchart illustrating an operation of the brake control device 10 according to the present embodiment.

The wheel load estimation unit 20 estimates a wheel load Q which is a load received by the wheel 71 from the friction material 51, on the basis of a wheel speed and a brake force applied to the wheel 71 by the friction material 51 (step S101). The brake force is a braking force obtained by pressing the friction material 51 against the wheel 71 in the first brake device 50. Note that the braking force obtained by pressing the friction material 51 against the wheel 71 actually varies depending on a state of a friction surface of the friction material 51, but here, it is assumed that the state of the friction surface of the friction material 51 is in a constant state. The state in which the friction surface of the friction material 51 is in a constant state is a state in which a friction coefficient μ is within a prescribed range in the entire region of the friction surface of the friction material 51 that actually presses the tread surface of the wheel 71, the side surface of the wheel 71, the disk attached to the axle, and the like. The wheel load estimation unit 20 acquires the brake force and the wheel speed from a vehicle control device (not illustrated) or the like that is mounted on the railway vehicle 70 and controls traveling of the railway vehicle 70.

The friction surface state quantity estimation unit 30 estimates a friction surface state quantity W, which is a state of the friction surface of the friction material 51, on the basis of the wheel load Q estimated by the wheel load estimation unit 20, the wheel speed, and a brake force command (step S102). The friction surface state quantity W is expressed by a numerical value, and can be obtained by computation as described later. The friction surface state quantity estimation unit 30 estimates a current friction coefficient μ of the friction material 51 from the estimated friction surface state quantity W. In a case where the estimated friction coefficient μ is less than a prescribed first threshold value, the friction surface state quantity estimation unit 30 outputs a mirror-surfacing signal indicating that the friction surface of the friction material 51 is in a mirror-surfaced state. The brake force command is a command output from the above-described vehicle control device or the like, and is a brake command indicating deceleration or the like, a brake release command for releasing the brake command, and the like. The first threshold value is a threshold value to be used when the friction surface state quantity estimation unit 30 determines whether or not to output the mirror-surfacing signal. The friction surface state quantity estimation unit 30 estimates the friction surface state quantity W of the friction material 51 on the basis of an integrated value of a workload in a period from the current time to a prescribed time in the past, and determines a sign of mirror surfacing of the surface state of the friction material 51 in accordance with the estimated friction surface state quantity W. The detailed configuration and operation of the friction surface state quantity estimation unit 30 will be described later.

The brake control unit 40 controls operations of the first brake device 50 and the second brake device 60 on the basis of the brake force command and presence or absence of the mirror-surfacing signal (step S103). Specifically, upon acquiring the mirror-surfacing signal, the brake control unit 40 performs control such that, in the next braking operation, a brake force of the first brake device 50 increases with respect to a ratio of the brake force of the first brake device 50 and a brake force of the second brake device 60 in a brake force applied to the railway vehicle 70 when the mirror-surfacing signal is not acquired. Upon acquiring the mirror-surfacing signal, the brake control unit 40 performs control such that a brake cylinder pressure for pressing the friction material 51 against the wheel 71 in the first brake device 50 increases as compared with a case where the mirror-surfacing signal is not acquired. Upon acquiring the mirror-surfacing signal, the brake control unit 40 performs control such that a brake force obtained by the second brake device 60 decreases as compared with a case where the mirror-surfacing signal is not acquired. For example, a brake force of the first brake device 50 applied to the railway vehicle 70 when the mirror-surfacing signal is not acquired is defined as R1, and a brake force of the second brake device 60 applied to the railway vehicle 70 when the mirror-surfacing signal is not acquired is defined as R2. In addition, a brake force of the first brake device 50 applied to the railway vehicle 70 when the mirror-surfacing signal is acquired is defined as R3, and a brake force of the second brake device 60 applied to the railway vehicle 70 when the mirror-surfacing signal is acquired is defined as R4. In this case, the brake control unit 40 controls operations of the first brake device 50 and the second brake device 60 so as to satisfy (R3/R4)>(R1/R2).

In the brake control device 10, the brake control unit 40 improves a surface state of the friction material 51 by increasing a ratio of the first brake device 50, that is, the pneumatic brake device, and prevents mirror surfacing of the friction material 51 by recovering the friction coefficient μ. Generally, when the wheel load Q is small, the friction surface of the friction material 51 is to be mirror surfaced, so that the friction coefficient μ decreases. Whereas, by applying a large wheel load Q to the friction material 51 for a certain period of time, the friction surface of the friction material 51 becomes moderately rough and the friction coefficient μ increases. The state of the friction surface of the friction material 51 changes depending on a brake braking history during traveling of the railway vehicle 70. Therefore, the friction surface state quantity estimation unit 30 periodically estimates the friction surface state quantity W of the friction material 51 during traveling of the railway vehicle 70.

Figure 3:
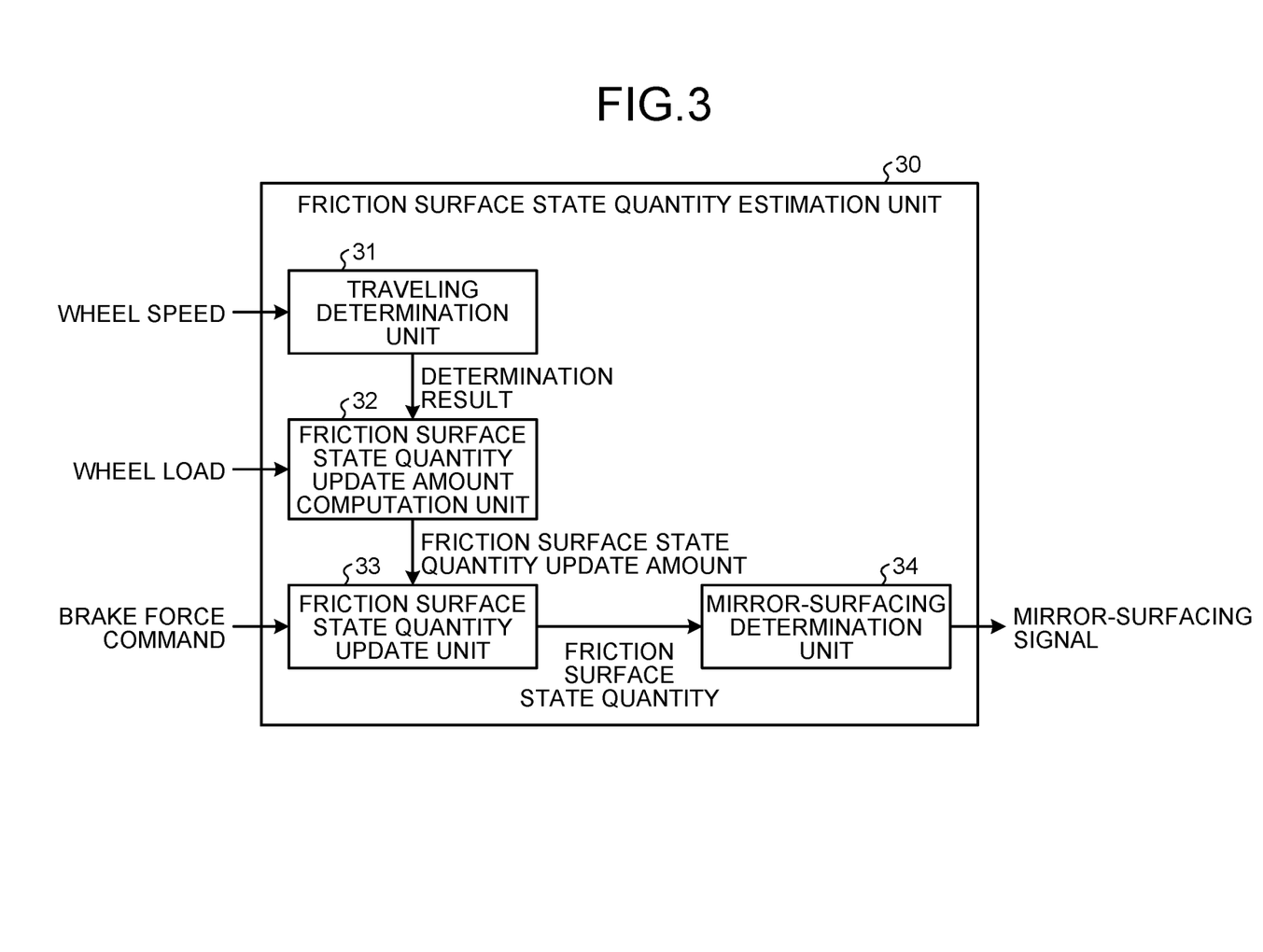
FIG. 3 is a diagram illustrating a configuration example of a friction surface state quantity estimation unit according to the embodiment.
Figure 4:
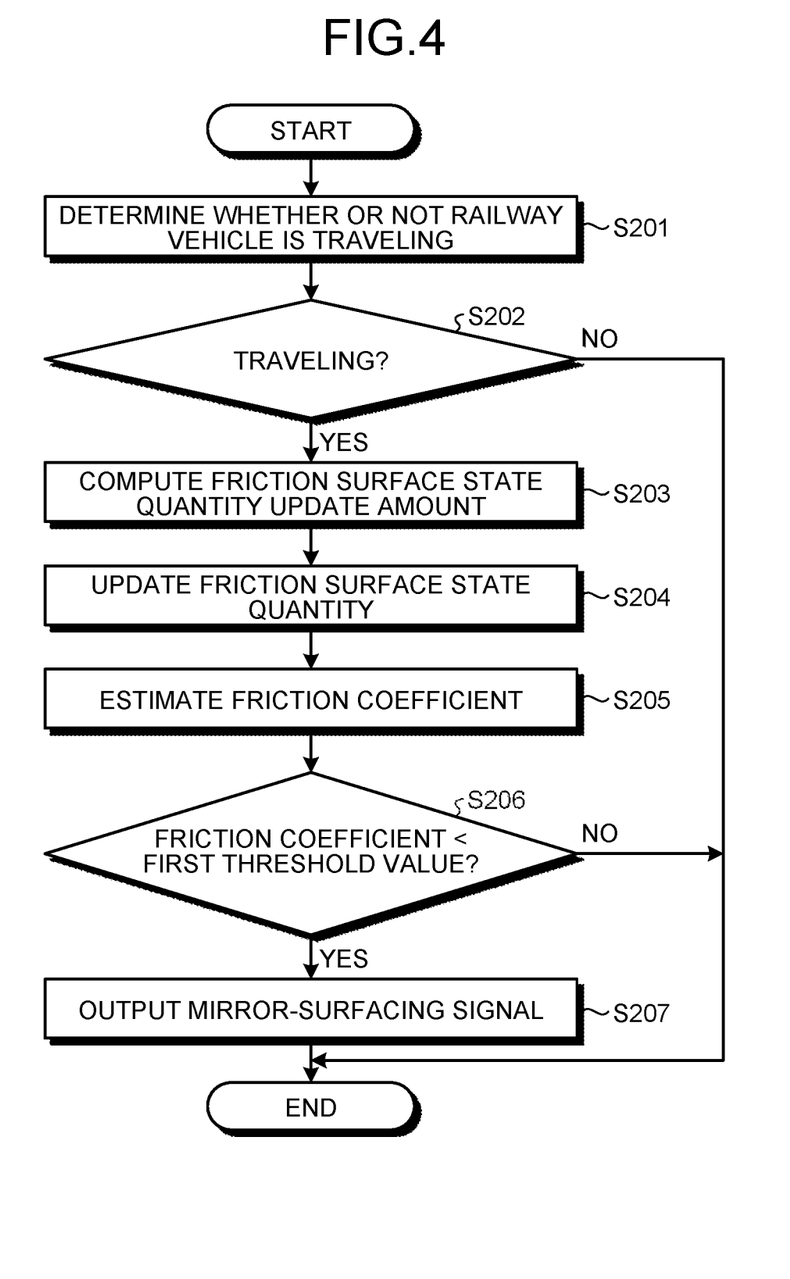
FIG. 4 is a flowchart illustrating an operation of the friction surface state quantity estimation unit according to the embodiment.

The detailed configuration and operation of the friction surface state quantity estimation unit 30 will be described. FIG. 3 is a diagram illustrating a configuration example of the friction surface state quantity estimation unit 30 according to the present embodiment. The friction surface state quantity estimation unit 30 includes a traveling determination unit 31, a friction surface state quantity update amount computation unit 32, a friction surface state quantity update unit 33, and a mirror-surfacing determination unit 34. FIG. 4 is a flowchart illustrating an operation of the friction surface state quantity estimation unit 30 according to the present embodiment. The flowchart illustrated in FIG. 4 illustrates details of the operation in step S102 of the flowchart illustrated in FIG. 2.

The traveling determination unit 31 determines whether or not the railway vehicle 70 is traveling, on the basis of a wheel speed (step S201). The traveling determination unit 31 outputs a determination result to the friction surface state quantity update amount computation unit 32. When the acquired wheel speed is equal to or larger than a preset threshold value, the traveling determination unit 31 determines that the railway vehicle 70 is traveling. The threshold value used by the traveling determination unit 31 is, for example, 5.0 [km/h].

When the friction surface state quantity update amount computation unit 32 acquires a determination result indicating that the railway vehicle 70 is not traveling from the traveling determination unit 31 (step S202: No), the friction surface state quantity update amount computation unit 32 finishes the operation. When the friction surface state quantity update amount computation unit 32 acquires a determination result indicating that the railway vehicle 70 is traveling from the traveling determination unit 31 (step S202: Yes), the friction surface state quantity update amount computation unit 32 computes a friction surface state quantity update amount $\Delta W$ of the friction material 51 on the basis of the wheel load Q (step S203). The friction surface state quantity update amount computation unit 32 outputs the computed friction surface state quantity update amount $\Delta W$ to the friction surface state quantity update unit 33. The friction surface state quantity update amount computation unit 32 sets a second threshold value for the wheel load Q, and computes the friction surface state quantity update amount $\Delta W$ on the basis of a comparison result between the wheel load Q and the second threshold value. The second threshold value is a threshold value to be used when the friction surface state quantity update amount computation unit 32 computes the friction surface state quantity update amount $\Delta W$. The friction surface state quantity update amount computation unit 32 computes the friction surface state quantity update amount $\Delta W = A \times Q$ when the wheel load Q is equal to or larger than the second threshold value, and computes the friction surface state quantity update amount $\Delta W = B \times Q$ when the wheel load Q is less than the second threshold value. Here, A and B are correction coefficients. The correction coefficients A and B are set in advance from material properties of the friction material 51 and the like. In a case where it is defined that the friction coefficient $\mu$ is to be in a high and favorable state as the friction surface state quantity W increases, the correction coefficient $A \geq 0$ and the correction coefficient $B \leq 0$ are satisfied. Note that the case where the correction coefficients A and B are 0 is a case where update of the friction surface state quantity W by the wheel load Q is ignored. In this way, when the wheel load Q is equal to or larger than the prescribed second threshold value, the friction surface state quantity update amount computation unit 32 sets, as the friction surface state quantity update amount $\Delta W$, a value obtained by multiplying the wheel load Q by the correction coefficient A, which is a first coefficient equal to or larger than 0. Further, when the wheel load Q is less than the prescribed second threshold value, the friction surface state quantity update amount computation unit 32 sets, as the friction surface state quantity update amount $\Delta W$, a value obtained by multiplying the wheel load Q by the correction coefficient B, which is a second coefficient equal to or less than 0.

The friction surface state quantity update unit 33 updates the friction surface state quantity W, which is a state of the friction material 51, on the basis of the friction surface state quantity update amount $\Delta W$ and the brake force command (step S204). The friction surface state quantity update unit 33 outputs the friction surface state quantity W desired to be updated, to the mirror-surfacing determination unit 34. The friction surface state quantity update unit 33 internally holds the friction surface state quantity W, and updates the friction surface state quantity W by setting $W \leftarrow \sigma W + \Delta W$, on the basis of the friction surface state quantity update amount $\Delta W$ acquired from the friction surface state quantity update amount computation unit 32. Here, $\sigma$ is a forgetting factor and is set to $\sigma \leq 1$. In order to prevent a controller (not illustrated) of the railway vehicle 70 from becoming unstable due to a fluctuation of the friction coefficient $\mu$ when the brake command is output, the friction surface state quantity update unit 33 updates the friction surface state quantity W at a timing when the brake force command changes from the braking command to the brake release command. In this manner, the friction surface state quantity update unit 33 updates the friction surface state quantity W as a new friction surface state quantity W, by multiplying the friction surface state quantity W obtained in the previous computation by the prescribed forgetting factor $\sigma$ and adding the friction surface state quantity update amount $\Delta W$ to the multiplication result.

The mirror-surfacing determination unit 34 estimates the friction coefficient $\mu$ from the friction surface state quantity W (step S205). The mirror-surfacing determination unit 34 outputs a mirror-surfacing signal to the brake control unit 40 when the friction coefficient $\mu$ is less than the first threshold value. Specifically, the mirror-surfacing determination unit 34 compares the estimated friction coefficient $\mu$ with the preset first threshold value (step S206). When the friction coefficient $\mu$ is less than the first threshold value (step S206: Yes), the mirror-surfacing determination unit 34 outputs the mirror-surfacing signal to the brake control unit 40 (step S207). The mirror-surfacing determination unit 34 may output information about the friction coefficient $\mu$ or information about a degree of mirror surfacing, to the brake control unit 40 together with the mirror-surfacing signal. When the friction coefficient $\mu$ is equal to or larger than the first threshold value (step S206: No), the mirror-surfacing determination unit 34 finishes the operation without outputting the mirror-surfacing signal.

As a result, in the brake control device 10, the brake control unit 40 having acquired the mirror-surfacing signal increases a ratio of the brake force of the first brake device 50, that is, the pneumatic brake device at the time of the brake command, so that the surface state of the friction material 51 can be improved and the friction coefficient $\mu$ of the friction material 51 can be recovered. When the brake control device 10 further acquires the information about the friction coefficient $\mu$ or the information about the degree of mirror surfacing, the brake control device 10 may change the ratio of the brake force of the pneumatic brake device in accordance with the friction coefficient $\mu$ or the degree of mirror surfacing.

Next, a hardware configuration of the brake control device 10 according to the present embodiment will be described. In the brake control device 10, the wheel load estimation unit 20, the friction surface state quantity estimation unit 30, and the brake control unit 40 are implemented by processing circuitry. The processing circuitry may be a memory that stores a program and a processor that executes the program stored in the memory, or may be dedicated hardware. The processing circuitry is also referred to as a control circuit.

Figure 5:
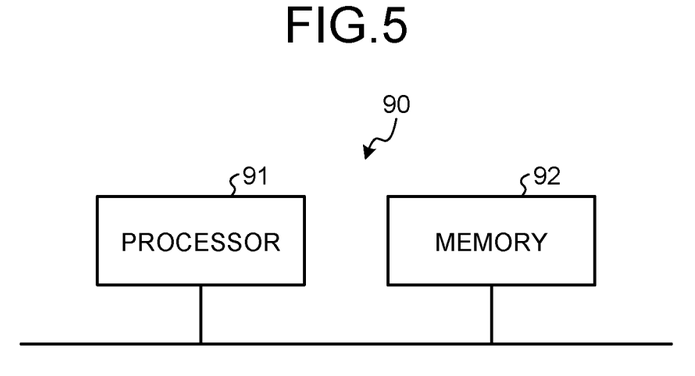
FIG. 5 is a diagram illustrating a configuration example of processing circuitry in a case where processing circuitry included in the brake control device according to the embodiment is implemented by a processor and a memory.

FIG. 5 is a diagram illustrating a configuration example of processing circuitry 90 in a case where processing circuitry included in the brake control device 10 according to the present embodiment is implemented by a processor 91 and a memory 92. The processing circuitry 90 illustrated in FIG. 5 is a control circuit, and includes the processor 91 and the memory 92. In a case where the processing circuitry 90 is configured with the processor 91 and the memory 92, each function of the processing circuitry 90 is implemented by software, firmware, or a combination of software and firmware. The software or the firmware is described as a program and stored in the memory 92. In the processing circuitry 90, the processor 91 reads and executes the program stored in the memory 92 to implement each function. That is, the processing circuitry 90 includes the memory 92 for storage of a program by which processing of the brake control device 10 is executed as a result. This program can also be said as a program for causing the brake control device 10 to execute each function implemented by the processing circuitry 90. This program may be provided by means of a storage medium in which the program is stored, or may be provided by means of other means such as a communication medium.

The program described above can also be said as a program for causing the brake control device 10 to execute: a first step, by the wheel load estimation unit 20, of estimating a wheel load Q which is a load received by the wheel 71 from the friction material 51, on the basis of a wheel speed and a brake force applied to the wheel 71 by the friction material 51; a second step, by the friction surface state quantity estimation unit 30, of estimating a friction coefficient μ of current time of the friction material 51 from a state of the friction surface of the friction material 51 on the basis of the wheel load Q, the wheel speed, and a brake force command, and outputting a mirror-surfacing signal indicating that the friction surface is in a mirror-surfaced state when the friction coefficient μ is less than a prescribed first threshold value; and a third step, by the brake control unit 40, of controlling operations of the first brake device 50 and the second brake device 60 on the basis of the brake force command and presence or absence of the mirror-surfacing signal.

Here, the processor 91 is, for example, a central processing unit (CPU), a processing device, an arithmetic device, a microprocessor, a microcomputer, a digital signal processor (DSP), or the like. Further, the memory 92 corresponds to a nonvolatile or volatile semiconductor memory such as a random access memory (RAM), a read only memory (ROM), a flash memory, an erasable programmable ROM (EPROM), or an electrically EPROM (EEPROM, registered trademark), a magnetic disk, a flexible disk, an optical disk, a compact disk, a mini disk, or a digital versatile disc (DVD).

Figure 6:
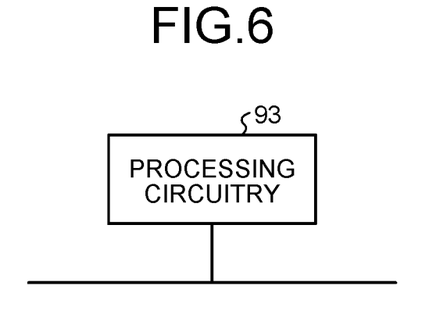
FIG. 6 is a diagram illustrating a configuration example of processing circuitry in a case where processing circuitry included in the brake control device according to the embodiment is implemented by dedicated hardware.

FIG. 6 is a diagram illustrating a configuration example of processing circuitry 93 in a case where processing circuitry included in the brake control device 10 according to the present embodiment is implemented by dedicated hardware. The processing circuitry 93 illustrated in FIG. 6 corresponds to, for example, a single circuit, a composite circuit, a programmed processor, a parallel-programmed processor, an application specific integrated circuit (ASIC), a field programmable gate array (FPGA), or a combination thereof. Note that a part of the processing circuitry 93 may be implemented by dedicated hardware, and a part may be implemented by software or firmware. In this manner, the processing circuitry 93 can implement the individual functions described above by dedicated hardware, software, firmware, or a combination thereof.

As described above, according to the present embodiment, the brake control device 10 has estimated the friction surface state quantity W of the friction material 51 of the first brake device 50 that is a pneumatic brake, and increased a ratio of the first brake device 50, that is, a pneumatic braking ratio to a preset value when the brake is applied next time in the railway vehicle 70, when there is a sign of mirror surfacing on the friction surface of the friction material 51. As a result, the brake control device 10 can improve the surface state of the friction material 51 and prevent mirror surfacing of the friction material 51. As a result, the brake control device 10 can achieve a target braking distance without weakening a braking force, by preventing occurrence of sliding of the wheel 71 of the railway vehicle 70 in advance. The brake control device 10 can prevent sliding of the wheel 71 while preventing extension of the braking distance of the railway vehicle 70.

The configurations illustrated in the above embodiment illustrate one example and can be combined with another known technique, and it is also possible to combine embodiments with each other and omit and change a part of the configuration without departing from the subject matter of the present disclosure.

REFERENCE SIGNS LIST

10 brake control device; 20 wheel load estimation unit; 30 friction surface state quantity estimation unit; 31 traveling determination unit; 32 friction surface state quantity update amount computation unit; 33 friction surface state quantity update unit; 34 mirror-surfacing determination unit; 40 brake control unit; 50 first brake device; 51 friction material; 60 second brake device; 70 railway vehicle; 71 wheel.

The invention claimed is:

1. A brake control device for controlling a first brake device that presses a friction material against a wheel to obtain a braking force and a second brake device that does not use the friction material, in a railway vehicle, the brake control device comprising:
   a wheel load estimation circuitry to estimate a wheel load that is a load received by the wheel from the friction material, based on a wheel speed and a brake force applied to the wheel by the friction material;
   a friction surface state quantity estimation circuitry to estimate a friction coefficient of current time of the friction material from a state of a friction surface of the friction material based on the wheel load, the wheel speed, and a brake force command, and output a mirror-surfacing signal indicating that the friction surface is in a mirror-surfaced state when the friction coefficient is less than a prescribed first threshold value; and
   a brake control circuitry to control operations of the first brake device and the second brake device, based on the brake force command and presence or absence of the mirror-surfacing signal.

2. The brake control device according to claim 1, wherein when the brake control circuitry acquires the mirror-surfacing signal, the brake control circuitry performs control such that a brake force of the first brake device increases with respect to a ratio of the brake force of the first brake device and a brake force of the second brake device in a brake force applied to the railway vehicle when the mirror-surfacing signal is not acquired.

3. The brake control device according to claim 2, wherein the friction surface state quantity estimation circuitry includes:
   a traveling determination circuitry to determine whether or not the railway vehicle is traveling based on the wheel speed, and output a determination result;
   a friction surface state quantity update amount computation circuitry to compute a friction surface state quantity update amount of the friction material based on the wheel load, upon acquiring a determination result indicating that the railway vehicle is traveling;
   a friction surface state quantity update circuitry to update a friction surface state quantity that is a state of the friction material, based on the friction surface state quantity update amount and the brake force command; and
   a mirror-surfacing determination circuitry to estimate the friction coefficient from the friction surface state quantity and output the mirror-surfacing signal when the friction coefficient is less than the first threshold value.

4. The brake control device according to claim 3, wherein the friction surface state quantity update amount computation circuitry sets, as the friction surface state quantity update amount, a value obtained by multiplying the wheel load by a first coefficient of 0 or more when the wheel load is equal to or larger than a prescribed second threshold value, and sets, as the friction surface state quantity update amount, a value obtained by multiplying the wheel load by a second coefficient of 0 or less when the wheel load is less than the prescribed second threshold value, and the friction surface state quantity update circuitry updates the friction surface state quantity as the friction surface state quantity that is new, by multiplying the friction surface state quantity obtained by previous computation by a prescribed forgetting factor and adding the friction surface state quantity update amount.

5. The brake control device according to claim 1, wherein the friction surface state quantity estimation circuitry includes:
a traveling determination circuitry to determine whether or not the railway vehicle is traveling based on the wheel speed, and output a determination result;
a friction surface state quantity update amount computation circuitry to compute a friction surface state quantity update amount of the friction material based on the wheel load, upon acquiring a determination result indicating that the railway vehicle is traveling;
a friction surface state quantity update circuitry to update a friction surface state quantity that is a state of the friction material, based on the friction surface state quantity update amount and the brake force command; and
a mirror-surfacing determination circuitry to estimate the friction coefficient from the friction surface state quantity and output the mirror-surfacing signal when the friction coefficient is less than the first threshold value.

6. The brake control device according to claim 5, wherein the friction surface state quantity update amount computation circuity sets, as the friction surface state quantity update amount, a value obtained by multiplying the wheel load by a first coefficient of 0 or more when the wheel load is equal to or larger than a prescribed second threshold value, and sets, as the friction surface state quantity update amount, a value obtained by multiplying the wheel load by a second coefficient of 0 or less when the wheel load is less than the prescribed second threshold value, and the friction surface state quantity update circuity updates the friction surface state quantity as the friction surface state quantity that is new, by multiplying the friction surface state quantity obtained by previous computation by a prescribed forgetting factor and adding the friction surface state quantity update amount.

7. A brake control method for a brake control device to control a first brake device that presses a friction material against a wheel to obtain a braking force and a second brake device that does not use the friction material, in a railway vehicle, the brake control method comprising:
estimating a wheel load that is a load received by the wheel from the friction material, based on a wheel speed and a brake force applied to the wheel by the friction material;
estimating a friction coefficient of current time of the friction material from a state of a friction surface of the friction material based on the wheel load, the wheel speed, and a brake force command, and outputting a mirror-surfacing signal indicating that the friction surface is in a mirror-surfaced state when the friction coefficient is less than a prescribed first threshold value; and
controlling operations of the first brake device and the second brake device, based on the brake force command and presence or absence of the mirror-surface state signal.

8. The brake control method according to claim 7, wherein
during the controlling operations of the first brake device and the second brake device, when acquiring the mirror-surfacing signal, control is performed such that a brake force of the first brake device increases with respect to a ratio of the brake force of the first brake device and a brake force of the second brake device in a brake force applied to the railway vehicle when the mirror-surfacing signal is not acquired.

9. The brake control method according to claim 8, wherein
the estimating the friction coefficient of current time and the outputting the mirror-surfacing signal includes:
determining whether or not the railway vehicle is traveling based on the wheel speed, and outputting a determination result;
computing a friction surface state quantity update amount of the friction material based on the wheel load, upon acquiring a determination result indicating that the railway vehicle is traveling;
updating a friction surface state quantity that is a state of the friction material, based on the friction surface state quantity update amount and the brake force command; and
estimating the friction coefficient from the friction surface state quantity and outputting the mirror-surfacing signal when the friction coefficient is less than the first threshold value.

10. The brake control method according to claim 9, wherein
during the computing the friction surface state quantity update amount, as the friction surface state quantity update amount, a value obtained by multiplying the wheel load by a first coefficient of 0 or more is set when the wheel load is equal to or larger than a prescribed second threshold value, and, as the friction surface state quantity update amount, a value obtained by multiplying the wheel load by a second coefficient of 0 or less is set when the wheel load is less than the prescribed second threshold value, and
during the updating the friction surface state quantity, the friction surface state quantity is updated as the friction surface state quantity that is new, by multiplying the friction surface state quantity obtained by previous computation by a prescribed forgetting factor and adding the friction surface state quantity update amount.

11. The brake control method according to claim 7, wherein
the estimating the friction coefficient of current time and the outputting the mirror-surfacing includes:
determining whether or not the railway vehicle is traveling based on the wheel speed, and outputting a determination result;
computing a friction surface state quantity update amount of the friction material based on the wheel load, upon acquiring a determination result indicating that the railway vehicle is traveling;

updating a friction surface state quantity that is a state of the friction material, based on the friction surface state quantity update amount and the brake force command; and estimating the friction coefficient from the friction surface state quantity and outputting the mirror-surfacing signal when the friction coefficient is less than the first threshold value.

12. The brake control method according to claim 11, wherein during the computing the friction surface state quantity update amount, as the friction surface state quantity update amount, a value obtained by multiplying the wheel load by a first coefficient of 0 or more is set when the wheel load is equal to or larger than a prescribed second threshold value, and as the friction surface state quantity update amount, a value obtained by multiplying the wheel load by a second coefficient of 0 or less is set when the wheel load is less than the prescribed second threshold value, and during the updating the friction surface state quantity, the friction surface state quantity is updated as the friction surface state quantity that is new, by multiplying the friction surface state quantity obtained by previous computation by a prescribed forgetting factor and adding the friction surface state quantity update amount.

* * * * *